United States Patent

[11] 3,603,683

[72] Inventors T. O. Paine
Acting administrator of the National Aeronautics and Space Administration with respect to an invention of;
John A. Meyer, Tonawanda, N.Y.
[21] Appl. No. 814,212
[22] Filed Dec. 16, 1968
[45] Patented Sept. 7, 1971
Continuation-in-part of application Ser. No. 417,848, Dec. 11, 1964, now abandoned.

[54] ALTITUDE-SENSING DEVICE
6 Claims, 5 Drawing Figs.
[52] U.S. Cl. .................................................. 356/4
[51] Int. Cl. .................................................. G01c 3/08
[50] Field of Search............................................ 356/4, 5

[56] References Cited
UNITED STATES PATENTS
| | | | |
|---|---|---|---|
| 3,489,495 | 1/1970 | Blau.............................. | 356/4 |
| 3,064,129 | 11/1962 | Jennings........................ | 356/4 X |
| 3,266,365 | 8/1966 | Stavis........................... | 356/4 |

Primary Examiner—Rodney D. Bennett, Jr.
Assistant Examiner—Joseph G. Baxter
Attorneys—Russell E. Schlorff, Marvin F. Matthews and G. T. McCoy ABSTRACT: A device for signaling critical altitude of a flight vehicle above a landing surface formed of a high intensity light source; an optical system for reflecting the light beam downwardly towards the landing surface; a pair of optical systems for receiving images of the illumination produced by the beam; a light-responsive electrical system for generating a usable voltage signal when the vehicle is at the critical altitude.

PATENTED SEP 7 1971

John A. Meyer
INVENTOR.

BY
ATTORNEYS

ALTITUDE-SENSING DEVICE

CROSS-REFERENCE TO RELATED APPLICATIONS

This application is a continuation-in-part of my copending application ser. No. 417,848, filed Dec. 11, 1964, now abandoned.

ORIGIN OF THE INVENTION

The invention described herein was made in the performance of work under a NASA contract and is subject to the provisions of Section 305 of the National Aeronautics and Space Act of 1958, Public Law 85—568 (72 Stat. 435; 42 U.S.C. 2457).

BACKGROUND OF THE INVENTION

This invention relates generally to altitude-sensing devices and more particularly to an altitude-sensing device capable of automatically providing a signal when a predetermined altitude is reached.

The problem of effecting soft landings on terrestrial surfaces or extraterrestrial surfaces such as the moon by spacecraft, and the like, has not heretofore been fully resolved. One technique which has been proposed involves the use of constant thrust retrorocket engines for decelerating the vehicle just prior to impact. This technique has utility in effecting landings by spacecraft in atmospheric environments even when used in conjunction with other landing impact systems such as parachutes and the like, but has even greater importance in effecting landings on extraterrestrial surfaces when there is no atmosphere. Effective use of this technique, however, requires an accurate determination of the vehicle velocity and height above the landing surface just prior to initiation of the reverse-thrust forces if excessive shock forces on impact are to be avoided. In addition, it is necessary that means be provided for signaling when the critical altitude for application of thrust is reached.

A variety of altitude-sensing devices are in current use for determining critical altitude. Some of these are sonic altimeters, pressure-sensitive altimeters, electronic sensors, mechanical probe devices, and various optical-ranging devices. Each of these, while suited to particular applications, has limitations. The sonic-type and pressure-sensitive-type altimeters, for instance, require an atmosphere which of course makes them unsuitable for use as altimeters above a planetary surface over which there is no atmosphere. Mechanical probe devices, in addition to the problems of mechanism lubrication and the possibility of cold welding, face innumerable other problems which concern their reliability. Also, to compensate for roll, pitch, or yaw movements of the vehicle, more than one probe must be used. Electronic sensors present the disadvantage of complexity and possible equipment failure, and with conventional optical-ranging devices which employ many moving parts, optical alignment is a major drawback.

SUMMARY OF THE INVENTION

The altimeter of the subject invention which overcomes most of these disadvantages, is a form of split field range finder. The system comprises a high intensity light source, the rays of which are directed to the landing surface. The illumination on the landing surface is reflected back to a pair of optical systems, which may include a reflecting mirror, producing images of the illumination. The images are transmitted to a light-responsive electrical system which may include a pair of photocells, which are simultaneously activated only at critical altitude. The coincident activation of the photocells thus provides a signal which is usable to trigger a retrorocket for initiating reverse thrust forces. The system may include an adjustable lens for focusing the line of sight of one of the reflecting mirrors at a selected angle of convergence with the line of sight of the other reflecting mirror and thereby provide a parallax adjustment for selecting critical altitude.

The split field altitude-sensing device of the invention is adapted to work over land or water and in total darkness or in daylight. Detection of the in-focus condition is automatic. The light beam, however, must be powerful, but its frequency spectrum may be selected for an optimum viewing so as to provide good separation from ambient color frequencies. The parallax adjustment of the optical part of the system, that is the adjustable lens, is not as sensitive as that required for the conventional optical range finder and its range error is therefore considerably less. The system, in addition, has the advantage of using an uncrowded portion of the electromagnetic spectrum.

Other objects and many of the attendant advantages of this invention will be readily appreciated as the same become better understood by reference to the following detailed description when considered in connection with the accompanying drawings in which like reference numerals designate like parts throughout the figures thereof.

DESCRIPTION OF THE PREFERRED EMBODIMENT

Figure 1:
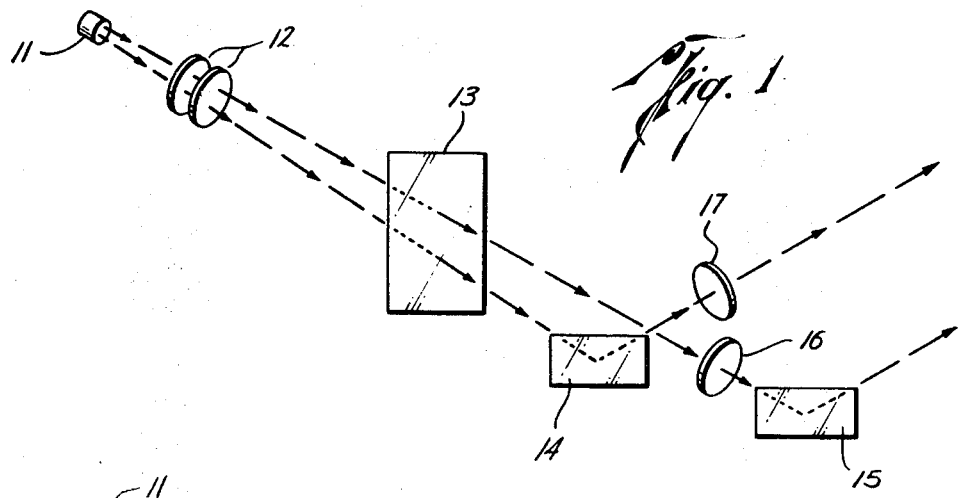
FIG. 1 is a schematic view of the projecting portion of the altitude-sensing device of this invention with the broken arrows indicating the direction of the light rays as they are projected toward the landing surface.

Referring more particularly to the drawings, the altitude-sensing device 10 of this invention comprises a high intensity light source 11 which directs its rays through a condenser lens and filter system 12 for transmission through a half-silvered, or semitransparent mirror 13. The rays through the half-silvered mirror are received by a pair of totally reflective mirrors 14 and 15, each of which is disposed in alignment with the half-silvered mirror and the light source. The mirrors 14 and 15, however, are vertically displaced one to another whereby half of the rays which are transmitted through the half-silvered mirror are received and reflected by the mirror 14 and the remaining rays are focused by a lens 16 onto the mirror 15 which is in a higher position relative to the mirror 14. An adjustable lens 17 is then used to focus the reflected rays from mirror 14 upon a landing surface. The reflected rays from mirror 15 are directed toward the landing surface by the fixed angle of mirror 15.

Figure 2:
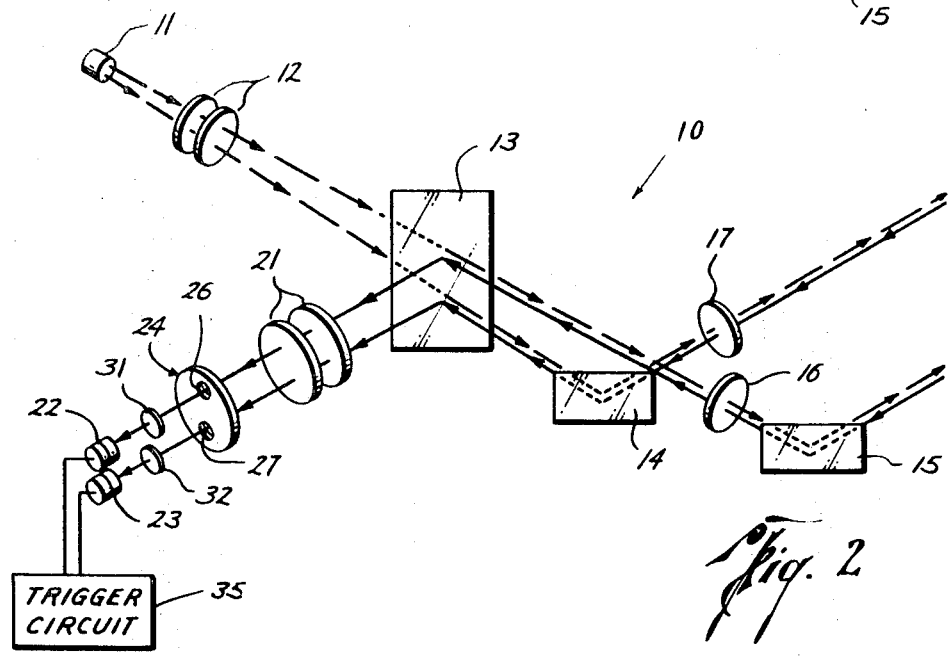
FIG. 2 is a schematic view of the altitude-sensing device of this invention with the solid arrows indicating the direction of light reflected from the landing surface.

Lens 17 may be adjusted by lateral motion, as denoted in FIGS. 1 and 2, by rotation, or by tilting, to provide parallax adjustment in the same manner as in a conventional optical range finder, such as those used in photography. The function of such a parallax adjustment, which may also be provided by a tilting mirror as in a conventional rangefinder is to enable selection of the critical angle of convergence of the two lines of sight of the rangefinder at which the parallactic shift is zero. That is, for an object at a distance from the optical base of the rangefinder corresponding to the selected critical angle of convergence, the rangefinder will provide images of that object which coincide, while at all other distances a parallax condition results by which the two images are separated by an amount corresponding to the distance error. In the present instance, therefore, the two light beams projected toward the landing surface by mirrors 14 and 15 have a predetermined angular relationship. More specifically, referring to FIG. 5, adjustable lens 17 enables selective control of the angle at which one of the light beams is directed toward the landing surface to thereby provide a selected angle convergence ω with the other light beam. This angle of convergence is chosen so as to fix a distance to the point of convergence of the light beams which corresponds to the critical altitude at which it is desired that the sensing device 10 will provide a signal. Consequently, for altitudes other than the critical altitude, the projected light beams strike the ground at points above or below the selected beam crossing to thereby result in two spots of illumination on the landing surface. Fixed mirror 15 functions analogous to the direct view window of a conventional range finder to project a spot of illumination which remains fixed and is relatively good focus for a considerable range of altitudes about the critical altitude. The light beam from mirror 14 and adjustable lens 17, however, strikes the ground obliquely to provide a dispersed pattern of illumination which is out of focus and displaced from the spot projected from mirror 15. At the critical altitude, of course, the light beams strike the ground at their point of convergence, and the two spots coalesce to provide a single, very bright and well-focused spot of illumination.

Figure 5:
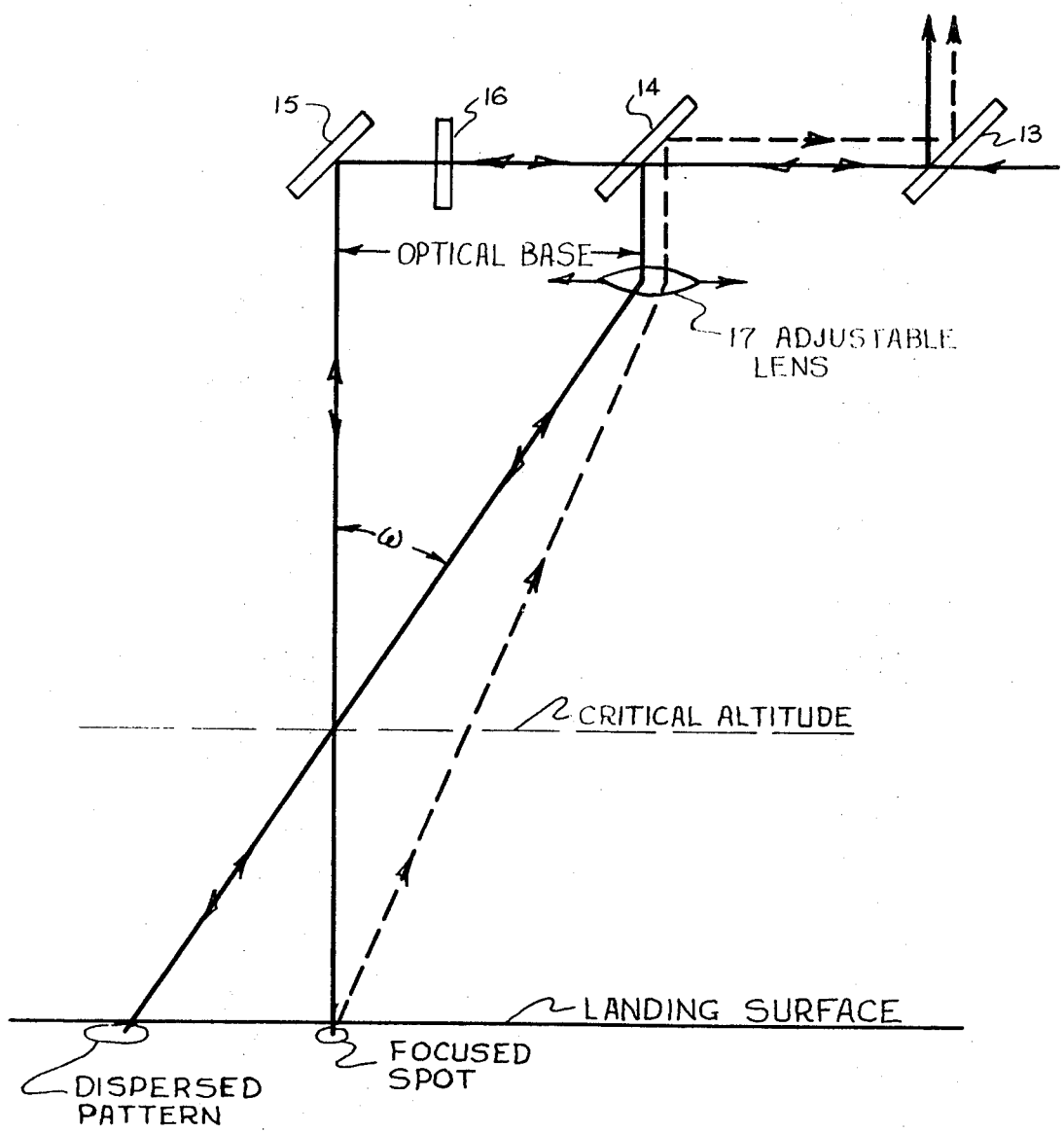
FIG. 5 is a ray diagram of the altitude-sensing device illustrated in FIG. 2.

As shown schematically in FIGS. 2 and 5, the light rays from the spot of illumination which is projected on the landing surface by the mirror 15 are reflected back to mirror 15 and redirected through the lens 16 which focuses them on to the upper part of the half-silvered mirror 13. As mirror 15 is analogous to the direct view window of a conventional range finder, this relatively bright reflected image will remain fixed for a considerable range of altitudes about the critical altitude. The light rays reflected back through lens 17 and mirror 14 are redirected to the lower part of the half-silvered mirror. At all noncritical altitudes the input to lens 17 and mirror 14 comprises both a relatively low intensity noiselike reflection from the dispersed pattern of illumination projected by mirror 14 and lens 17 and a parallax-affected image of the relatively bright spot projected by mirror 15. When the light beam spots coalesce at the critical altitude, a very bright image is reflected via both of the mirrors 14 and 15 with the parallax affect eliminated.

The two sets of reflected rays which reach half-silvered mirror 13 from the mirrors 14 and 15 impinge upon the reflective surface thereof and are optically projected through a condenser lens and filter system 21 towards a pair of photocells 22 and 23 which are positioned to receive the rays. However, interposed between the condenser lens and filter system 21 and the photocells is an apertured mask 24 which is provided with a pair of circular apertures 26 and 27. The geometry of the system is arranged whereby at critical altitude the images of the single, very bright and well-focused spot of illumination on the landing surface pass through the apertures in the mask and are thereby displayed for reception by the photocells. A focusing lens 31 is interposed in alignment with the aperture 26 and the photocell 22 for focusing the upper image from the mirror 15 on to the photocell. Similarly, a focusing lens 32 is interposed in alignment with the aperture 27 and photocell 23 for focusing the lower image from mirror 14 on the photocell, at the critical altitude.

Figure 3:
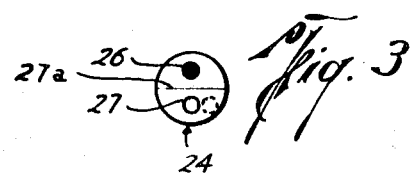
FIG. 3 shows a view of the reflected images from a landing surface as they appear on a mask in the receiver end of the altitude-sensing device when at noncritical altitudes.
Figure 4:
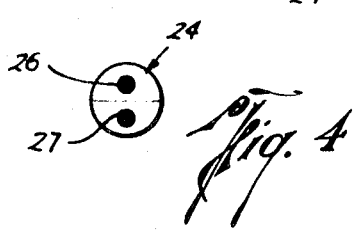
FIG. 4 shows a view of the reflected images from a landing surface as they appear on the mask in the receiver end of the device when at critical altitudes.

When a spacecraft or other vehicle using the altitude-sensing device of this invention approaches a landing surface, the two circular images from the mirrors 14 and 15 fall in a field of view which is divided into two halves divided by the line 27a, as shown in FIG. 3. The upper half of the image is fixed in position, as this is the image of the ground spot of illumination reflected by mirror 15. Due to parallax, the lower half of the image from lens 17 and mirror 14 is displaced to the right or left of the circular aperture 27 and is occluded by the mask when the spacecraft is not at critical altitude. This lower half of the image, as noted before, is predominantly that of the light spot projected by mirror 15, the low intensity reflection from the dispersed pattern of illumination projected by mirror 14 and lens 17 merely appearing as background noise. At all times the photocell 22 views the image from mirror 15. As the spacecraft reaches critical altitude, however, the image from the lower mirror 14 moves into the lower aperture 27 of the mask as shown in FIG. 4 and activates the photocell 23. Simultaneous activation of both photocells and a suitable trigger circuit 35 then develops a voltage signal which is used to trigger the retrorocket and initiate reverse thrust forces for softening the landing impact.

A variety of conventional trigger circuits might be used for igniting the retrorocket engine and might comprise, for example, relay switches which are closed by the activation of the photocells to complete a firing circuit.

It will therefore be seen that a novel altitude-sensing device is disclosed herein which is automatically capable of providing an electrical signal when a critical altitude is reached. While particularly useful in slowing the descent of a spacecraft to a landing surface, the device has obvious utility in many other circumstances. It could be used, for example, as a helicopter altimeter or as a "flameout" altimeter for aircraft. It could also find utility in automatic-focusing devices for cameras, in collision-warning devices for vehicles, and in numerous other applications which require distance-measuring equipment. This altitude-sensing device has the particular advantages of simplicity in operation and a high degree of accuracy and reliability. It is an active system which is adapted to work over land or water and in total darkness or daylight. If the vehicle is to descend over a brilliantly illuminated area, the beams of light from the spacecraft could be pulsed to reduce the problem of distinguishing from the high ambient light conditions. Positioning of the optical elements must be done with precision, however, so that the images form simultaneously on both photocells at only the critical altitude.

It should also be understood, of course, that the foregoing disclosure relates only to preferred embodiments of the invention and that it is intended to cover all the changes and modifications of the examples of the invention herein chosen for the purposes of the disclosure and which do not constitute departure from the spirit and scope of the invention.

What is claimed and desired to be secured by Letters Patent is:

1. A device for signaling a critical distance to a distant object, said device comprising:
   a light source;
   means for reflecting the light rays from said source toward the distant object, the reflecting means including a pair of spaced reflecting elements disposed in fixed positions to receive part of the light rays from said light source and to reflect said rays toward the distant object in a pair of beams in predetermined angular relationship, one of the beams being in relatively good focus for a considerable range about the critical distance;
   a half-silvered mirror interposed between said light source and said reflecting elements in a position to transmit incident rays from said source and to reflect incident rays from said reflecting elements, said predetermined angular relationship of the beams being selected whereby images of the spots of illumination produced by said beams are formed in said half-silvered mirror in a predetermined range of distances including said critical distance by reflection to said reflecting elements and from said reflecting elements to said half-silvered mirror;
   a pair of means for receiving images of the illumination on the distant object produced by said beams; and
   signal-producing means associated with said receiving means for signaling the critical distance from said distant object when the images of the illumination the the distant object are received by said receiving means at the critical distance.

2. The device specified in claim 1 in which the self-producing means includes a pair of photosensitive devices positioned to detect the reflected images from said half-silvered mirror and to be energized thereby.

3. The device specified in claim 2 including a masking means interposed between said pair of photosensitive devices and the half-silvered mirror, for masking the reflected images from the half-silvered mirror whereby said images are received by both of said photosensitive devices only at the critical distance.

4. The device specified in claim 3 including electrical circuit means operatively associated with said photosensitive devices for electrically signaling when both of said photosensitive devices are simultaneously energized.

5. A system for signaling critical altitude of a flight vehicle above a landing surface, said system comprising:
   means for projecting a beam of high intensity light;
   means for reflecting said light bean downwardly towards the landing surface, including means for splitting said high intensity beam into two beams which are reflected downwardly toward the landing surface in a fixed angular relation to each other so that they coalesce only at the critical altitude; and
   a pair of means for receiving images of the ground spots of illumination on the landing surface produced by said beams including light-responsive electrical circuit means associated with said receiving means for generating a usable voltage signal when the images of the ground spots of illumination are received by said receiving means at the critical altitude and displaying said spot images at only the critical altitude.

6. An altitude-sensing device for automatically signaling critical altitude of a flight vehicle above a landing surface, said device comprising:
   a light source;
   optical condenser and filter means for the light rays from said light source;
   means for dividing the light rays from said source which pass through said optical condenser means into two beams, said last mentioned means comprising a pair of spaced reflecting elements disposed in fixed positions to receive part of the light rays transmitted through said optical condenser and filter means and to reflect said rays downwardly towards the landing surface in a pair of beams in predetermined angular relationship;
   a half-silvered mirror interposed between said optical condenser and filter means and said reflecting elements in a position to transmit incident rays from said source and to reflect incident rays from said reflecting elements, said predetermined angular relationship of the beams being selected whereby images of the ground spots of illumination on the landing surface produced by said beams are formed in said half-silvered mirror in a predetermined range of altitudes including said critical altitude by reflection from the landing surface to said reflecting elements and from said reflecting elements to said half-silvered mirror;
   a pair of photosensitive devices;
   optical projection means for projecting said images from the half-silvered mirror to the photosensitive devices to energize the same;
   a masking means interposed between said pair of photosensitive devices and said optical projection means for masking said images reflected from the half-silvered mirror whereby said images are received by both of said photosensitive devices only at the critical altitude; and
   electrical circuit means operatively associated with said photosensitive devices for electrically signaling when both of said photosensitive devices are simultaneously energized.